United States Patent
Ledet

(10) Patent No.: US 9,565,298 B1
(45) Date of Patent: Feb. 7, 2017

(54) METHOD AND DEVICE FOR APPENDING INFORMATION IN A CONVERSATION IN A VOICE BASED NETWORKING WEBSITE

(75) Inventor: David Gerard Ledet, Allen, TX (US)

(73) Assignee: Open Invention Network LLC, Durham, NC (US)

(*) Notice: Subject to any disclaimer, the term of this patent is extended or adjusted under 35 U.S.C. 154(b) by 79 days.

(21) Appl. No.: 13/456,267

(22) Filed: Apr. 26, 2012

Related U.S. Application Data

(63) Continuation-in-part of application No. 12/913,848, filed on Oct. 28, 2010.

(60) Provisional application No. 61/317,541, filed on Mar. 25, 2010, provisional application No. 61/317,788, filed on Mar. 26, 2010.

(51) Int. Cl.
| | |
|---|---|
| *H04M 3/00* | (2006.01) |
| *G06F 17/30* | (2006.01) |
| *H04M 3/42* | (2006.01) |
| *H04M 1/725* | (2006.01) |

(52) U.S. Cl.
CPC ......... *H04M 3/42008* (2013.01); *H04M 1/725* (2013.01)

(58) Field of Classification Search
CPC .................................. G06F 17/30; G06F 17/00
See application file for complete search history.

(56) References Cited

U.S. PATENT DOCUMENTS

| | | |
|---|---|---|
| 3,557,717 A | 1/1971 | Chivers |
| 3,564,160 A | 2/1971 | Temes et al. |
| 3,577,678 A | 5/1971 | Burton |
| 3,619,342 A | 11/1971 | Burke |
| 3,619,418 A | 11/1971 | Lewis |
| 3,620,927 A | 11/1971 | Leathen |
| 3,623,024 A | 11/1971 | Hamilton |
| 3,627,624 A | 12/1971 | Kreuz |
| 3,630,012 A | 12/1971 | Guertler |
| 3,635,726 A | 1/1972 | Sair |
| 3,637,405 A | 1/1972 | Mendelson |
| 3,639,166 A | 2/1972 | Fellows |
| 3,640,232 A | 2/1972 | Mullen |
| 3,640,712 A | 2/1972 | Field et al. |
| 3,642,204 A | 2/1972 | McCloskey |
| 3,644,177 A | 2/1972 | Zyk |
| 3,658,640 A | 4/1972 | Coscia |

(Continued)

FOREIGN PATENT DOCUMENTS

WO    WO 2010022392 A1 *    2/2010    ......... H04L 12/1827

OTHER PUBLICATIONS

Facebook, Party Line, http://www.facebook.com/apps/application.php?id=24334230464 Apr. 27, 2010.

(Continued)

*Primary Examiner* — Farhan Syed
(74) *Attorney, Agent, or Firm* — Haynes and Boone, LLP

(57) ABSTRACT

Certain aspects of the present disclosure relates to a computer implemented method for executing application code to connect with a voice based networking website, the method includes connecting at least a user in a conference through the voice based networking website. The information provided by at least the user is appended in a conversation after the conference is over. The appended information is displayed in the voice based networking website as per a timestamp.

14 Claims, 10 Drawing Sheets

(56) References Cited

U.S. PATENT DOCUMENTS

| | | | |
|---|---|---|---|
| 3,673,079 A | 6/1972 | Mulaskey | |
| 3,673,109 A | 6/1972 | Georgescu | |
| 3,676,552 A | 7/1972 | Levin et al. | |
| 3,676,578 A | 7/1972 | Cahill | |
| 3,693,557 A | 9/1972 | Makuch | |
| 3,698,009 A | 10/1972 | Barbier | |
| 3,713,976 A | 1/1973 | Bunting | |
| 3,713,984 A | 1/1973 | Bunting | |
| 5,835,712 A * | 11/1998 | DuFresne | 709/203 |
| 5,889,774 A * | 3/1999 | Mirashrafi et al. | 370/352 |
| 5,903,732 A * | 5/1999 | Reed et al. | 709/229 |
| 5,925,106 A * | 7/1999 | Nielsen | 709/247 |
| 5,956,720 A * | 9/1999 | Fernandez et al. | |
| 5,991,809 A * | 11/1999 | Kriegsman | 709/226 |
| 6,026,087 A * | 2/2000 | Mirashrafi et al. | 370/389 |
| 6,098,085 A * | 8/2000 | Blonder et al. | 715/208 |
| 6,101,486 A * | 8/2000 | Roberts et al. | 705/14.66 |
| 6,144,670 A * | 11/2000 | Sponaugle et al. | 370/401 |
| 6,157,943 A * | 12/2000 | Meyer | 709/203 |
| 6,185,306 B1* | 2/2001 | Mages et al. | 380/203 |
| 6,209,026 B1* | 3/2001 | Ran et al. | 709/218 |
| 6,212,548 B1* | 4/2001 | DeSimone | H04L 12/1813 709/204 |
| 6,219,694 B1* | 4/2001 | Lazaridis et al. | 709/206 |
| 6,230,204 B1* | 5/2001 | Fleming, III | 709/229 |
| 6,278,449 B1* | 8/2001 | Sugiarto et al. | 715/826 |
| 6,304,637 B1* | 10/2001 | Mirashrafi et al. | 379/88.17 |
| 6,310,941 B1* | 10/2001 | Crutcher et al. | 379/88.17 |
| 6,314,425 B1* | 11/2001 | Serbinis et al. | |
| 6,327,589 B1* | 12/2001 | Blewett et al. | |
| 6,338,096 B1* | 1/2002 | Ukelson | 719/319 |
| 6,344,851 B1* | 2/2002 | Roberts et al. | 345/418 |
| 6,344,853 B1* | 2/2002 | Knight | 345/629 |
| 6,370,580 B2* | 4/2002 | Kriegsman | 709/226 |
| 6,426,956 B1* | 7/2002 | Eteminan | H04L 12/66 370/328 |
| 6,484,149 B1 | 11/2002 | Jammes et al. | |
| 6,839,417 B2* | 1/2005 | Weisman | H04M 3/42008 379/204.01 |
| 7,024,454 B1 | 4/2006 | Waxier | |
| 7,162,519 B2 | 1/2007 | Jenkins | |
| 7,295,836 B2* | 11/2007 | Yach | H04M 1/725 379/93.17 |
| 7,483,871 B2 | 1/2009 | Herz | |
| 7,565,359 B2 | 7/2009 | Nazem et al. | |
| 7,707,163 B2* | 4/2010 | Anzalone | G06F 17/30592 707/999.107 |
| 8,135,747 B2* | 3/2012 | Anzalone | G06F 17/30592 707/791 |
| 8,255,923 B2* | 8/2012 | Youel | G06Q 10/107 719/313 |
| 8,364,720 B2* | 1/2013 | Levy | G06F 17/3002 382/100 |
| 8,599,836 B2* | 12/2013 | Van Buren | H04M 3/4936 370/352 |
| 8,775,473 B2* | 7/2014 | Anzalone | G06F 17/30592 707/791 |
| 8,924,412 B2* | 12/2014 | Rhoads | G06F 17/3002 707/694 |
| 2002/0128036 A1* | 9/2002 | Yach | H04M 1/725 455/552.1 |
| 2003/0061279 A1* | 3/2003 | Llewellyn | G06F 9/542 709/203 |
| 2004/0225716 A1* | 11/2004 | Shamir | G06F 17/30873 709/204 |
| 2006/0271507 A1* | 11/2006 | Anzalone | G06F 17/30592 |
| 2007/0156726 A1* | 7/2007 | Levy | G06F 17/3002 |
| 2007/0186165 A1 | 8/2007 | Maislos et al. | |
| 2007/0192352 A1* | 8/2007 | Levy | G06F 17/3002 |
| 2007/0208711 A1* | 9/2007 | Rhoads | G06F 17/3002 |
| 2007/0218980 A1* | 9/2007 | Pachnis | A63F 13/12 463/25 |
| 2008/0178096 A1* | 7/2008 | Kusuda | H04L 12/66 715/758 |
| 2008/0313260 A1* | 12/2008 | Sweet | G06F 17/3089 709/201 |
| 2009/0063568 A1 | 3/2009 | Choe et al. | |
| 2009/0259970 A1* | 10/2009 | Hawkins | G06Q 10/10 715/810 |
| 2010/0011373 A1* | 1/2010 | Youel | G06Q 10/107 719/313 |
| 2010/0325142 A1* | 12/2010 | Anzalone | G06F 17/30592 707/769 |
| 2011/0182283 A1* | 7/2011 | Van Buren | H04M 3/4936 370/352 |
| 2012/0259893 A1* | 10/2012 | Anzalone | G06F 17/30592 707/792 |
| 2013/0198242 A1* | 8/2013 | Levy | G06F 17/3002 707/803 |
| 2013/0242119 A1* | 9/2013 | Ralston | H03M 7/40 348/207.1 |

OTHER PUBLICATIONS

Vivox, The Voice for Games, Voice Chat for Games and Virtual Worlds, http://www.facebook.com/pages/Natick-MA/Vivox-Inc/99504071839?v=app_4949752878, Apr. 27, 2010.

Phonevite, http://phonevite.com, Apr. 27, 2010.

TwitterFone, http://twitterfone.com/ Apr. 27, 2010.

Tweet Call, http://tweetcall.com/, Apr. 27, 2010.

Microsoft Office Sharepoint Server, http://sharepoint2007.microsoft.com/pages/default.aspx, printed on Apr. 27, 2010, 2 pages.

Srilakshmi N. Chakravarthy, IBM, "Method for Personalizing Search Results with Domain Relevance," Apr. 12, 2005, 5 pages.

\* cited by examiner

| Method | Description |
|---|---|
| comments.get | Returns all comments for a given xid posted through fb:comments. This method is a wrapper for the FQL query on the comment FQL table. |
| data.getCookies | Returns all cookies for a given user and application. |
| fbml.refreshImgSrc | Fetches and re-caches the image stored at the given URL. |
| fbml.refreshRefUrl | Fetches and re-caches the content stored at the given URL. |
| fql.query | Evaluates an FQL (Facebook Query Language) query. |
| fql.multiquery | Evaluates a series of FQL (Facebook Query Language) queries in one call and returns the data at one time. |
| friends.areFriends | Returns whether or not each pair of specified users is friends with each other. |
| friends.get | Returns the identifiers for the current user's Facebook friends. |
| friends.getAppUsers | Returns the identifiers for the current user's Facebook friends who have authorized the specific calling application. |
| friends.areFriends | Returns whether or not each pair of specified users is friends with each other. |
| friends.get | Returns the identifiers for the current user's Facebook friends. |
| friends.getAppUsers | Returns the identifiers for the current user's Facebook friends who have authorized the specific calling application. |
| friends.getLists | Returns the identifiers for the current user's Facebook friend lists. |
| friends.getMutualFriends | Returns the identifiers for the requested users' Mutual Facebook friends. |
| groups.get | Returns all visible groups according to the filters specified. |
| groups.getMembers | Returns membership list data associated with a group. |

Fig. 3

METHOD AND DEVICE FOR APPENDING INFORMATION IN A CONVERSATION IN A VOICE BASED NETWORKING WEBSITE

This application is a Continuation-In-Part of U.S. patent application Ser. No. 12/913,848, entitled "Method and System for Generating an Electronic Medium", which was filed on Oct. 28, 2010 and claims priority to an earlier filed U.S. Provisional Application Ser. No. 61/317,541, entitled "Voice Based Social Media", which was filed on Mar. 25, 2010, and U.S. Provisional Application Ser. No. 61/317,788, entitled "Dynamic Collaboration and Document-Management Platform", which was filed on Mar. 26, 2010, the entire contents of each of which are hereby incorporated by reference.

The above applications, as well as U.S. Pat. No. 6,426,956 titled "Voice-Browsing System and Method Therefor" are incorporated herein by reference.

FIELD OF THE INVENTION

The disclosed embodiments relate to an application code to a voice based networking website, and more particularly, to a method and a computing device to append information in a conversation in the voice based networking website.

BACKGROUND OF THE INVENTION

Instant, fast and accurate communication is few of the driving forces for social networking websites/applications including FaceBook, Tweeter, LinkedIn, etc. At least due to these reasons the social networking sites have become popular recently. Web portals such as LinkedIn, Twitter, and FaceBook have approximately millions of users. As of March 2009, according to Nielsen Online, social networks or blogs account for nearly 10% of all Internet time, and the "Member Communities" category of sites surpassed the email category in Internet popularity, measured by time on site. The social media sites have permeated the Internet. It is widely understood that LinkedIn is where you work and/or have worked, Twitter is what you are currently doing, and FaceBook is who you are.

The social media site, FaceBook, uses an application called "Wall". The wall is located on the FaceBook profile tab. For Example, if a user communicates with another user, it may be located on the wall. When the user clicks on a friend's name, the user name and brief profile may be present along with the communication on the wall on the profile page. To write on someone else's wall, go to their page, and write something in the box at the top of the page that says "Write Something". To respond to something written on your wall, click the "Comment" link under their comment and it will be inserted (chronologically) under the entry. Conversations occur this way in the site. Users are able to view conversations (or multiple entries by many different people) by the comments left under the entry left on the wall.

The social media site, Twitter is used by millions of people. As of April 2009, this site has grown approximately more than 700% this year alone, to more than 10 million users, and growing. Twitter is "a service for friends, family, and co-workers to communicate and stay connected through the exchange of quick, frequent answers to one simple question: What are you doing?" . . . . With messaging systems (like Twitter), things happen in a different manner. Users send short (140 characters max) messages via a computer or cellular device that are posted to the site. Users "follow" other users and receive their messages. So, any message posted to the site is automatically seen by those users that are following the user that sent the message.

The social media site, LinkedIn is the world's largest professional network with approximately over 55 million members and growing rapidly. LinkedIn connects you to your trusted contacts and helps you exchange knowledge, ideas, and opportunities with a broader network of professionals. LinkedIn is where a user can get connected to other users, building a trusted network of contacts. A user is able to send private messages that are posted inside the system privately.

All these social media web portals lack advanced voice based browsing features.

U.S. Publication 2009/0259970, titled "System and Method for Random Voice Communications through a Social Network" is directed towards voice connections between users of a social network. The users are granted access to the social network via a VoIP phone. Another embodiment includes a communications management system (CMS) configured to manage voice communications through a social network. A connection coordinator configured to connect randomly a first user to a second user in response to a user request. Independent claim 1 recites a method for establishing voice connections between users of a social network, the method comprising granting a user access to a social network through a VoIP phone; navigating the social network based on user input; and directly connecting the user to a second user randomly for voice communications based on an authorization. The claims are based on the user interacting through a VoIP phone only. There are other major shortcoming in this publication 2009/0259970.

The social network portals may be implemented by the CMS and the communications network. Connection rooms are a call bridge enabling any number of users to communicate simultaneously. Users within the connection room may be automatically linked to the connection room based on user profiles, preferences, histories, or other data.

The communication devices such as laptop, VoIP phone, or cellular device can connect to parties outside through the CMS without utilizing the social network implemented in the CMS.

PartyLine is a Facebook application that lets you voice chat with your Facebook friends. When you add Party Line to your Facebook account, you will be able to create group chats with up to 5 people at one time. Set up a chat with your friends. Then you can all get on Party Line at the same time and chat together. This utilizes the phone numbers stored in Facebook as the called number when establishing the party line connections. The application interfaces with FaceBook to originate the conference call (establish the original call to the conference port), and to obtain the numbers of the parties on the call if they are FaceBook friends.

Vivox Web Voice is an application for Facebook that includes an award winning Vivox Network with the social environment of Facebook, making connecting with friends easier than ever. Users can have virtual reunions, play games or conduct meetings. Vivox Web Voice for Facebook is designed to provide a simple way to get a group talking. In addition to the core app, Vivox may be working with developers to integrate custom voice capabilities into their applications. Vivox application allows communication through the computer's browser on the FaceBook page. There is a button to turn the user's microphone on and off to allow speaking. The connected user is heard through the user's computer speakers. Vivox allows real-time communication utilizing the FaceBook application to initiate the conference parameters and contacts but Vivox fails to allow the user to make a recording and post the recording on a user's wall.

Phonevite is another application but the user cannot only send voice messages to your friends via phone, but you can also share recordings via Twitter (  ), Facebook (  ), MySpace (  ), email or just embed the audio directly to your website. Once you have made a voice recording (either via a recording browser app or via phone), the recording will appear in your recording inbox. Now, however, you will see five small icons at the bottom for each of the key social services and embeds. Twitter will create the ready-to-share tweet once you post a recording to Twitter.

TwitterFone allows sending messages to Twitter via the phone with TwitterFone. The application utilizes voice-to-text algorithms to convert the data. If TweetCall the user calls an 800 number and speaks the tweet into the phone. The voice is transcribed and posted to Twitter as text.

What is needed is a computer executable code to append information in a conversation in the voice based networking website.

Therefore, present invention disclosure describes such a tool that improves usability of the above mentioned applications.

SUMMARY OF THE INVENTION

Certain aspects of the present disclosure provide a computer implemented method for executing application code in voice based networking website. The method generally includes connecting at least a user to a conference through the voice based networking website; appending at least an information provided by at least the user in a conversation after the conference is over; and displaying the appended information in the voice based networking website as per a timestamp.

Certain aspects of the present disclosure provide a computing device for executing application code to connect with a voice based networking website. The computing device generally includes a processor including a memory communicably coupled to the processor and storing instructions to configure the computing device to analyze computer code via operations including: connect at least a user to a conference through the voice based networking website; append at least an information provided by at least the user in a conversation after the conference is over; and display the appended information in the voice based networking website as per a timestamp.

Certain aspects of the present disclosure provide a computer-readable media having computer-executable instructions embodied thereon, the computer-executable instructions upon execution configuring a computer to perform operations for executing application code to connect with a voice based networking website. The computer-readable medium include code for: connecting at least a user to a conference through the voice based networking website; appending at least an information provided by at least the user in a conversation after the conference is over; and displaying the appended information in the voice based networking website as per a timestamp.

BRIEF DESCRIPTION OF THE DRAWINGS

In the accompanying figures, similar reference numerals may refer to identical or functionally similar elements. These reference numerals are used in the detailed description to illustrate various embodiments and to explain various aspects and advantages of the present disclosure.

FIG. 3 depicts a block diagram of a subset of a data retrieval method, in according to the invention;

Figure 1:
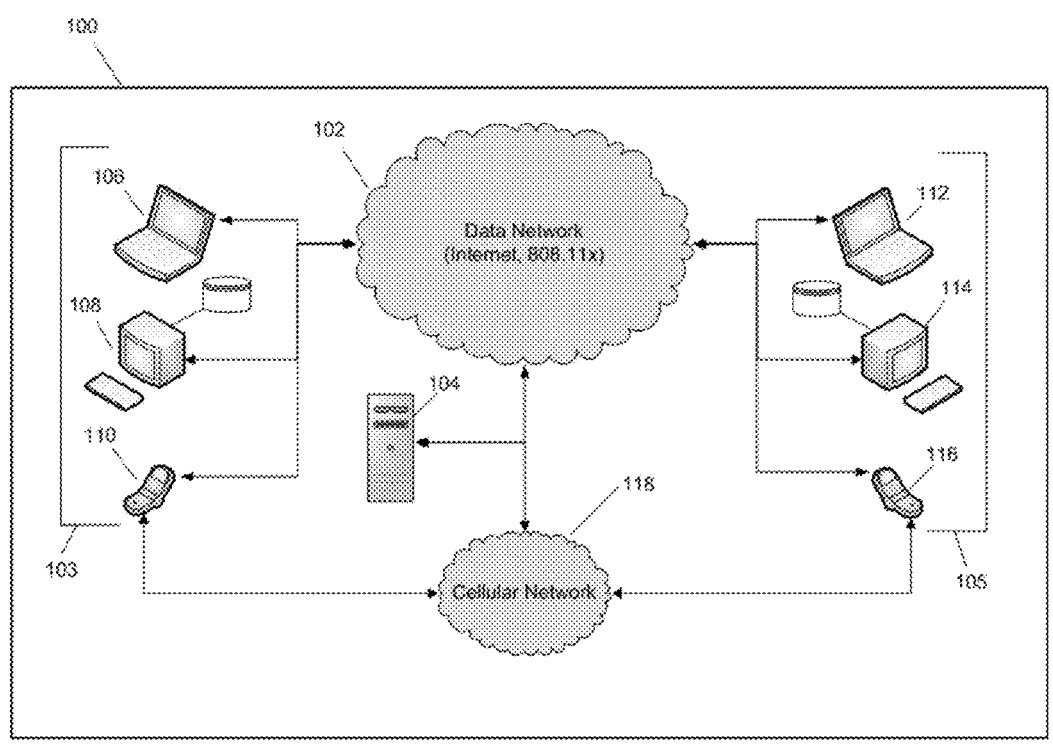
FIG. 1 is a block diagram illustration of a network environment for use with the system to generate a computer implemented executable code for electronic medium, according to the invention.

The foregoing summary, as well as the following detailed description of certain embodiments of the present invention, will be better understood when read in conjunction with the appended drawings. The drawings illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

It should be observed that apparatus parts and components have been represented by conventional symbols in the drawings, showing only specific details that are relevant for an understanding of the present disclosure. Further, details that may be readily apparent to person ordinarily skilled in the art may not have been disclosed.

Aspect of the present invention may be used in a computing device to connect with a voice based networking website, the method includes connecting at least a user in a conference through the voice based networking website. The information provided by at least the user is appended in a conversation after the conference is over. The appended information is displayed in the voice based networking website as per a timestamp.

In an embodiment of the present invention FIG. 1 displays the network architecture of the present invention. As depicted in FIG. 1, the invention allows a user utilizing a client machine 103 to access the current invention (in the form of software, for example) to be downloaded from the server 104 or that currently resides on the client's machine 103. The client machine can be any of a mobile laptop device 106, a personal desktop computer 108, or a wireless device 110 or any other device normally utilized with current technology. The client machine 103 is connected to the Internet 102.

By example only, it is assumed that the application of the present invention resides on the server 104 but could reside completely or in a distributed manner on one or more of the devices or networks in FIG. 1. The user may access the client machine 103, and connecting to a remote 105 machine, which includes any of a mobile laptop device 112, a personal desktop computer 114, or a wireless device 116. The remote 105 may be connected to the Internet 102. If the client is on a wireless device 110/116, the system 104 can be accessed via the Internet 102, or the Wireless Network (such as a Cellular Network, for example) 118. It should be noted that other types of devices, in addition to a cellular device that can also transmit and receive information could be used with the present invention.

In an embodiment of the invention, the user may access the application via a cellular device 103, or 105, and connected by a cellular network 118. Notifications can be sent from the server 105 to the client's computer 103 via the Internet 102, or through the cellular network 118. The application can also be utilized by other devices normally utilized for accessing the internet, for example, a PDA, an MP3 player, a gaming device (such as a hand held system or home based system, etc).

In an embodiment of the present invention a user may communicate with a group of other users that can be obtained from a social networking site. The application of the current invention utilizes a voice browsing technology where voice channels may not be allocated through the length of the call as a regular cellular voice call. The application can be accessed through a cellular phone, or a computer system. The details and history of the conversation are stored on the application's web site where a user can interact with an ongoing conversation, or insert new voice elements, and/or media into a previous conversation.

In one embodiment, described later in detail, a user may interact with a conversation that he/she may or may not be present when the conversation begins. People are not always able to be present when the group's conversation occurs. The application allows users to "chime in" on conversations that may have occurred previously, injecting comments at the relevant parts of the previous conversation, including but not limited, voice message, text, media files, etc.

Another embodiment detailed below describes a user that is alerted when previous conversations are updated with new elements. The user is able to see the entire conversation in the application's GUI, wherein the application scrolls down the conversation, centering the speech elements to where the new element is centered on the user's screen. The new speech element(s) are displayed with the "Play" button a different color, and the replay button disabled indicating that the user has not listened to that part of the conversation.

Another embodiment detailed below functionality wherein users may be able to insert media into the conversation (photos, video, music) and the media may be injected into the conversation on the applications site, and can be viewed by users in real time or when the conversation is over.

Aspect of the invention includes Utilization of Voice Browsing Technology wherein the user of the current invention is able to receive audio of the conversation and input audio to add to the conversation via any wireless device using any communication protocol (herein referred to as a cellular device). A normal cellular device has many shortcomings if utilized in the normal manner. To make a call, the user must dial digits, routing the call through the normal cellular system, allocating voice and data channels through the cellular network. Also associated with the normal use of cellular devices is the time of dial-up delay, the considerable time between the commencement of dialing and the completion of the connection.

Interfacing with the current invention utilizing a cellular device varies greatly from making a normal cellular call. The Voice Browsing techniques of the '956 patent utilizes the cellular device wherein regular voice channels are not utilized, and no dialing is needed. U.S. Pat. No. 6,426,956 incorporates the functionality of voice browsing and is utilized by cellular devices to communicate with automated voice systems to gather information, but traditional cellular devices utilizing voice browsing suffer from the same problems mentioned above; dial-up delay, channel allocation, etc.

The patent '956 is carried out in one form by a method of voice browsing utilizing a telecommunication network. An origination packet containing a voice frame is transmitted by a subscriber unit. The origination packet is routed to a system server via the telecommunication network utilizing a wireless non-circuit-switched service thereof. Within the system server, the origination packet is converted into a markup-language (XML) query. The XML query is transmitted from the system server to an application server. Within the application server, an XML reply is fetched in response to the XML query. The XML reply is received from the application server at the system server. The XML reply is converted into a destination packet within the system server. The destination packet is routed to the subscriber unit via the telecommunication network utilizing the wireless non-circuit-switched service thereof. The destination packet is received at the subscriber unit.

Figure 2:
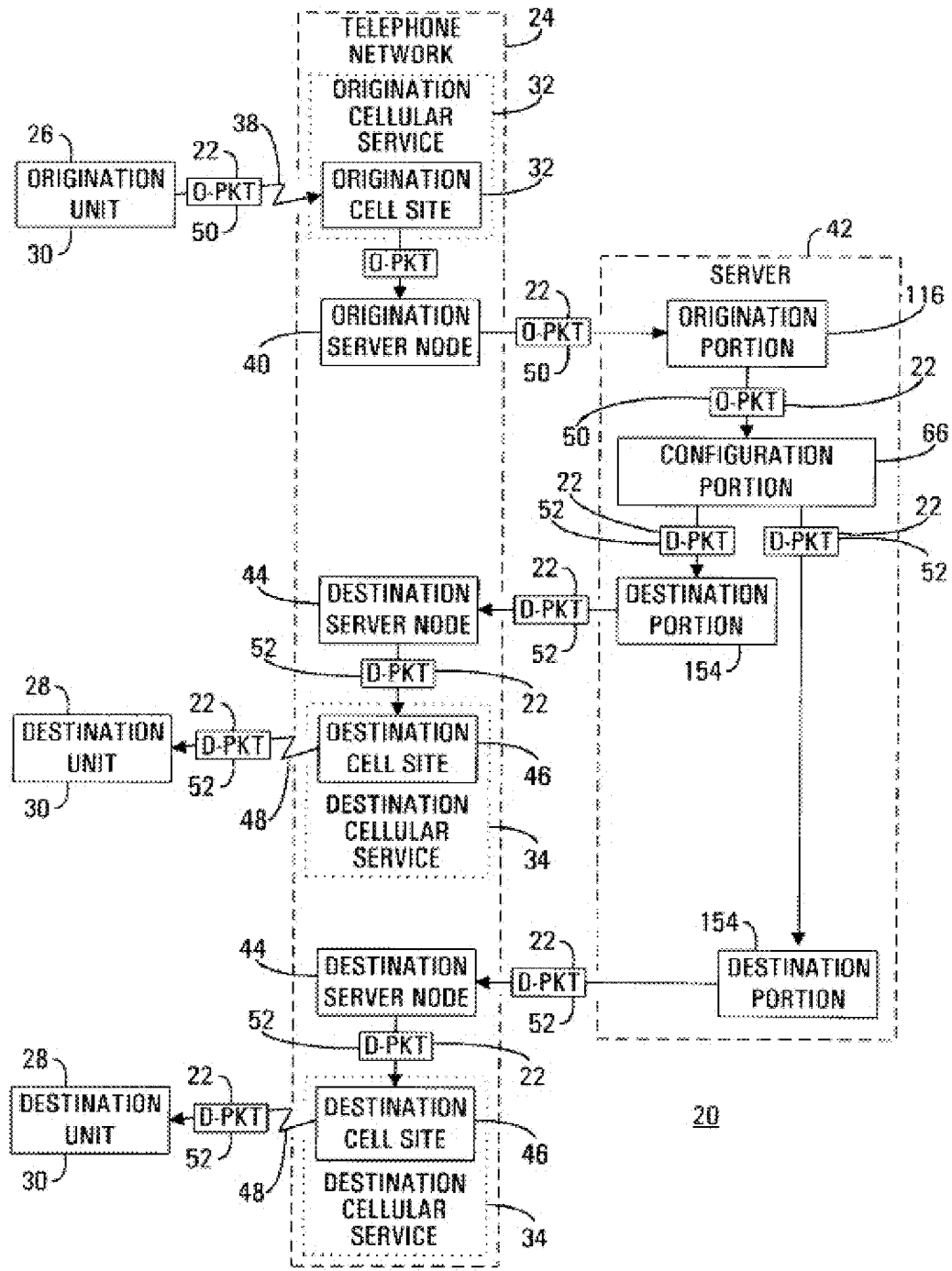
FIG. 2 is a block diagram illustrates a voice browsing architecture in a social networking website, in according to the invention.

FIG. 2 illustrates a voice browsing architecture. FIG. 2 shows a block diagram depicting a system 20 for dispatching an information packet 22 in accordance with voice browsing. A telecommunication network 24 is used as a base for simplex information-packet dispatching system 20. For purposes of this discussion, telecommunication network 24 is taken to be at least portions of the worldwide global telecommunication network, encompassing both wireless (cellular) and wired portions thereof. Those skilled in the art will appreciate that different portions of network 24 operate in different manners, but that the manner of operation is irrelevant to this discussion, wherein any functional manner of operation is deemed to be appropriate. It will also be appreciated that, when system 20 serves a restricted area (e.g., a single city) network 24 may be taken to be a subset of the global telecommunications network, perhaps even a single cellular telephone system.

An origination unit 26 is configured to generate information packet 22. System 20 dispatches information packet 22 from origination unit 26 to a destination unit 28. The path information packet 22 takes between origination unit 26 and destination unit 28 is a simplex path. That is, information packet 22 proceeds only in a single direction, forward, and all links in that path need only be simplex (unidirectional) links. Origination and destination units 26 and 28 are cellular telephones connected to network 24. Preferably, origination unit 26 is a digital cellular subscriber unit 30 of a cellular telephone service serving as an origination cellular service 32 of network 24. Similarly, destination unit 28 is a digital cellular subscriber unit 30 of a cellular telephone service serving as a destination cellular service 24 of network 24.

Those skilled in the art will appreciate that origination cellular service 32 and destination cellular service 34 may in actuality be the same cellular telephone service, and indeed may be the entirety of network 24, when system 20 is configured to serve a restricted area (e.g., a single city). Conversely, origination cellular service 32 and destination cellular service 34 may be displaced geographically, and may be functionally different (e.g., digital cellular telephone services in the United States and in France), in which case, origination unit 26 may be different in kind from destination unit 28, even though both are digital cellular subscriber units 30. Examples of differing digital cellular telephone systems are those meeting the well-known GSM, TDMA, CDMA, CDMA2000, and UMTS standards. Each information packet 22 is routed between origination/destination units 26/28 using a wireless non-circuit-switched service. Each cellular telephone is capable of providing three types of wireless service. Circuit-switched service is the normal full-duplex, high-bandwidth, high-power-consumption service used for conventional cellular telephony. Short-message service is a simplex, low-bandwidth, low-power consumption service used primarily to pass data to and from subscriber unit 30. Packet-switched service is a low-power-consumption service used primarily for the transmission of data packets. System 20 utilizes either short-message or packet-switched service for the simplex dispatching of information packets 22 containing voice (audio) frames, hence non-circuit-switched service.

Each information packet 22 may be routed from origination unit 26 to an origination cell site 36 within network 24 via a wireless non-circuit-switched-service (NCSS) channel 38 of origination cellular service 32 of network 24. Information packet 22 is then routed through an origination server node 40 of network 24 to a server 42. Network 24 assigns NCSS (short-message-service or packet-switched-service) channels for this communication, which channels occupy much less spectrum and consume much less power than a circuit-switched-service channel.

After being processed within server 42, information packet 22 is routed through one or more destination server nodes 44 of network 24 and to a destination cell site 46 of one or more destination cellular services 34. From one or more destination cell sites 46, information packet 22 is routed to one or more destination units 28 via a wireless NCSS channel 48 of destination cellular service 34.

Those skilled in the art will appreciate that server nodes 40 and/or 44 may or may not be a part of cellular services 32 and/or 34, respectively. The locations of server nodes 40 and 44 and their connectivity to cellular services 32 and 34 are beyond the scope of the present discussion. For the purposes of the present invention, server nodes 40 and 44 have connectivity with cell sites 36 and 46, respectively, through network 24.

Setting up the Group of Users: The user of the application can download the application of the current invention via a client computer, or a mobile device, or any other device supporting the application, see FIG. 1 and the discussion therein. Upon application initialization, the user's acquaintances are automatically downloaded utilizing the friends and acquaintances discovered in the user's existing social media sites.

FaceBook has published a set of methods and procedures that external programmers (to FaceBook) can utilize to obtain information about FaceBook users. A subset of the Data Retrieval methods is shown in FIG. 3. Utilizing the friends.get( )method, the application obtains the friend's of the FaceBook user. Using this list, the application can execute user.getStandardInfo( ) or user.getInfo( ) to obtain more detailed information about the user. Users.getInfo( ) returns an array of user-specific information for each user identifier passed. The user is determined from the session-_key parameter. The storable values returned from this call are those under the affiliations element, the notes_count value, the proxied_email address, and the contents of the profile_update_timed element.

The use of the getInfo( ) call is to get user data that you intend to display to other users (of your application, for example). If you need some basic information about a user for analytics purposes, call users.getStandardInfo instead.

Using a Smart Phone: The application of the current invention discusses the interactions of the conversation through the applications web site. It is also possible to interact with the application of the current invention with cell phones only. For example, let us assume that the user utilizing a smart phone. While the application of the current invention is executing on the user's smart phone, by simply speaking the name of the person, or tapping the person's picture, the application on the user's device will initiate a conversation with the remote user.

Because the application may allow conversation without the utilization of voice channels, certain elements are available that normally would not be possible with a normal cellular phone call. For example, assuming that the user is involved in a conversation with many parties. When a party begins to talk, the application can super-impose the party's name over the conversation so that the listener can know who is speaking. Other functions can also be implemented, for example: the speaking party's image on a communication device such as the smart phone, voice based browser turns a different color reflecting who is speaking at that time.

While on a conversation, a user of the current invention can be on hands free and interact with the application that is executing on the user's smart phone. For example, the user can add another user to the conversation by simply touching a button on the device and another party will be added to the conversation. While the user is involved in a conversation on hands free, all of the parties in the conversation are displayed on at least the smart phone. This also allows the user to perform user-specific actions. For example, the user can send media to a party in the conversation by pressing their image, and attaching the media, then pressing a send button. Other actions can be thought of as well that greatly raise the functionality of the invention.

Filtering: The application filters the conversation. By filtering, each part of the group's conversation is queued and delivered in a sequential manner. Therefore, if two people speak at the same time, the messages may be delivered sequentially to the listener(s). This allows the users in the conversation to receive the parts of the conversation without overlap of other users.

As detailed in FIG. 2, a user of the current application can interface with the application of the current invention through a cellular device 26. The analog speech may be converted to originating packets 22 that are routed to a cellular site 32, then to an origination server node 40. The originating packets are routed to a server 42. An XML Query message may then generated and sent to an adjacent application server (not depicted) wherein the application of the current invention can reside.

The XML Query Language (XQL) is a query language for XML documents. The basic constructs of XQL correspond directly to the basic structures of XML, and XQL is closely related to XPath, the common locator syntax used by XSL and XPointers. Since queries, transformation patterns, and links are all based on patterns in structures found in possible XML documents, a common model for the pattern language used in these three applications is both possible and desirable, and a common syntax to express the patterns expressed by that model simplifies the task of the user who must master a variety of XML-related technologies. Although XQL originated before XSL Patterns, there were strong similarities between the two languages, and the XPath syntax have been adopted for the constructs which differed. Not all constructs found in XPath were needed for queries, and some constructs used in XQL are not found in XPath, but the two languages share a common subset.

The application of the current invention interacts with the server 42 via the XML Query language. The XML may be parsed from the incoming XML Query, and processed.

When delivering the speech element to listening user(s), the application residing on the application server sends a XML reply to the server 42 which generates destination packets 22, and routes them to a destination server node 44 within the telephone network 24. The destination packets are then routed to the destination cell site 46 to be delivered to the destination user. Finally, the destination packets 22 are delivered to the user's cellular device 28 wherein the packets are converted to analog and delivered to the destination user.

The application of the current invention can reside on the server 42 or on an adjacent server not shown, or in the cellular device 26. The incoming elements of the conversation may be stored by the current application in the server 42 according to the originating timestamp. When delivered to the listener, the elements of the conversations are delivered consecutively to the listener because the next recording will not play until the currently playing speech element is complete.

The application makes the speech elements of the conversation available to the application's web site. The server 42 has connection to the Internet, and stores the individual speech recordings on the application's web site.

Web services are small units of code designed to handle a limited set of tasks using XML based communicating protocols. They are independent of operating systems, programming languages. They are used to connect people, systems and devices. The application of the current invention utilizes web services to allow the server 42 to communicate with the application utilizing the XML Query language. Through web services, the server calls the remote methods sending the voice packets to the application in an XML Query.

Interactions with the Invention via a Cellular Device: A user of the current invention is able to interact with functionality of the application by utilization of the cellular phone exclusively. To initiate a conversation, the user begins the application on the cellular device, and speaks the name of the party with whom a conversation is desired. The user is then able to converse with the party and the conversation is begun.

A history of the conversation continues to be recorded on the application's web site: To add additional parties to the conversation, the user presses either a number on the cellular phone, or (in the case of a smart phone), presses the party's picture. The additional party is then added to the conversation. This can continue with the addition of other users enabling all parties to communicate. The user can append the conversation in a later time for other parties to view it and comment if required. These conversations along with other information may be recorded on the applicant's we site.

Interactions with the Invention via a Web Site: When a user initiates a conversation in the application, the user indicates the parties in the conversation by choosing from a list of acquaintances using the application via a cellular device, or the computer system. Any physical action referred herein can also be performed via verbal commands. An example of the GUI on both the cellular device and/or computer system that is presented to the user is depicted in FIG. 4.

Figure 4:
FIG. 4 depicts a graphical user interface (GUI) on both the cellular device and/or computer system that is presented to the user, in according to the invention.

In FIG. 4, the user has initiated a new conversation and the "Choose Acquaintances" Window is displayed. The user has the option to select one, many or all friends in the combo box displayed. The user will hold the "Control" key to select multiple items. Once the user has selected the friends to be included, the "Begin" button is pressed, and the conversation will begin with the users that have been selected.

Once the conversation is begun, the user simply speaks into either the cellular device, or the computer system. If the user is on a cellular device, the recording is stopped by pressing a key on the device. If the user is on a computer system, then a separate window will be shown to the user (not shown), and a button on the window will be pressed to end the conversation element. The recording of that part of the conversation is recorded, and stored in the application.

Once the first recording is stored in the application, the parties will be notified of the conversation. The application can send a notification of any type or manner to the devices of the parties in the new conversation indicating that a new conversation has begun in various ways including by not limited to:

The social networking site is update by a new entry on the user's board.

SMS/USSD text message to the party's cellular device

A notification interworked with the Social Network application that the user currently uses.

Email notification

The method of notification varies by the functionality of the cellular device. Cellular devices interwork with social networking sites in many different ways according to the functionality of the device.

Other cellular devices, known as smart phones, allow a social networking application that runs on the device. The application of the current invention can run in the device as a standalone application, or as part of the social networking application running on the device. If the application is executed on the device, the application can tie into the notification system on the device. The notification system is part of the operating system on the device, and the application will utilize system level calls to alert the user of a new conversation.

Once a conversation has begun, the invited parties receive notification that a new conversation has begun. A reply button in the GUI is displayed to the user giving the user the ability to add to the conversation as well as attach media to the conversation.

The conversation may include but not linked to voice based conversation (voice chat) or text based conversation (text chat) or both voice and text conversation. The information may include but not limited to a profile of a user, text/voice/media files messages that the use shares from other users, etc.

In another embodiment of the current invention, the application automatically inserts media files (jpg, mpeg, picture, video, web link, etc) into the website upon analyzing the speech in the conversation. Speech analysis functionality exists in the application that analyzes the speech in the conversation. The application is aware of the party speaking in each of the individual parts of the conversation. This awareness allows the application to perform many various activities that make it more intuitive.

For instance, if the user talks about a baseball game last night, the application, aware of the game that user was attending, will search the user's media on the current device and automatically upload the media taken by the user at the game automatically seen by all parties in the conversation. This media is automatically inserted into the application's website, both on the application server and the parties cellular devices if applicable. The media inserted into the portal may be linked with at least an URL, a tag, a shortcut to another file, etc.

In another example, the user in a conversation says, "Did you see the funny clip of . . . " followed by a video clip in a popular online video application. The application automatically seeks out that video, and provides a clickable URL link on the web site, and/or on the parties cellular devices if applicable. The users are able to click the URL to begin playing the video, or the video automatically begins to play for the user to see the video that the party mentioned.

Figure 5:
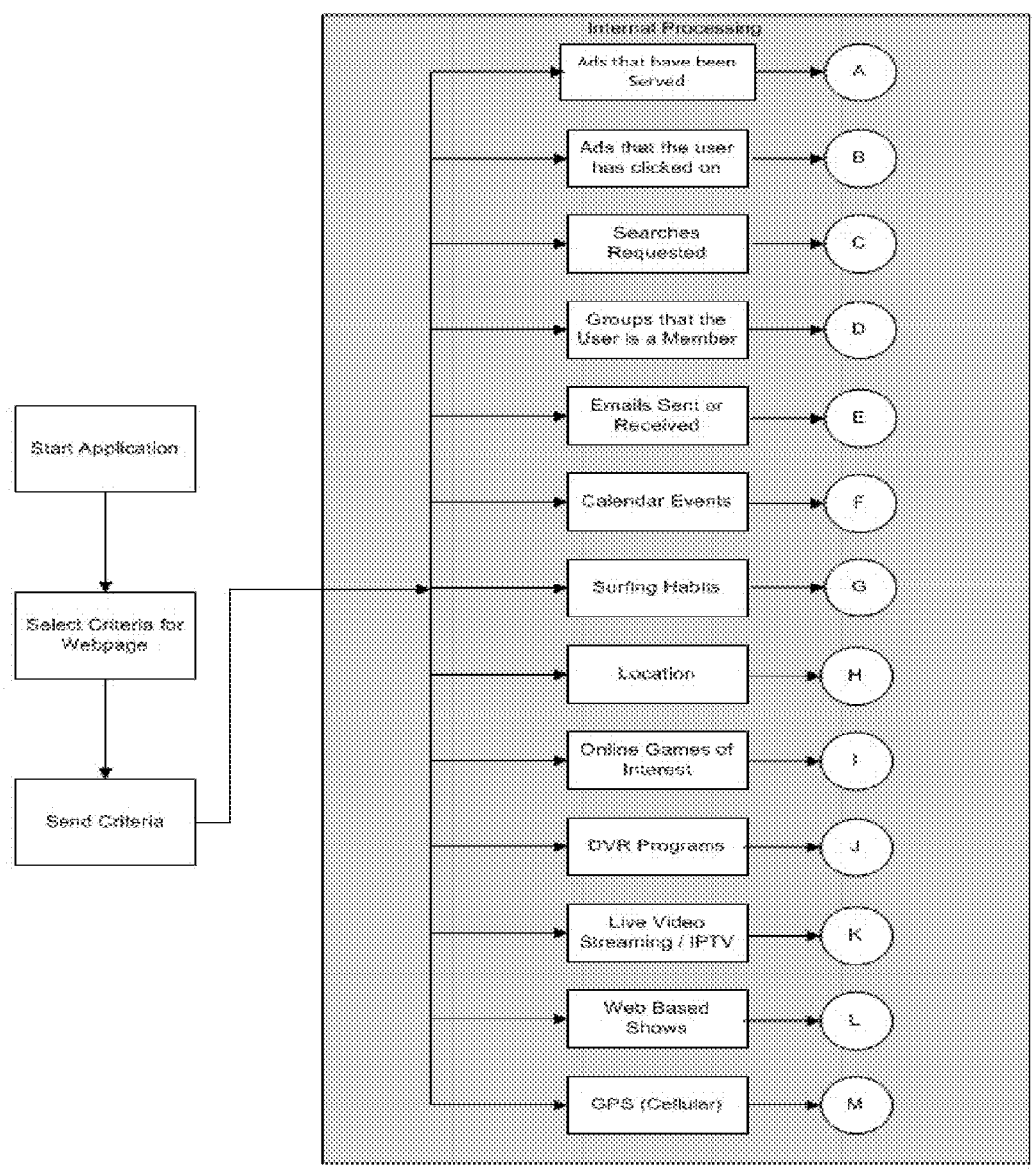
FIG. 5 is a block diagram illustrating a system for building a webpage, showing in particular the elements of an exemplary search scenario involving multiple sources of content, according to the invention.

FIG. 5 is a block diagram illustration of a conversation tracked by the application, showing a more detailed inventory of the various sources of content. FIG. 5 discloses the local and remote systems of the user are scanned and the application is aware of the current interests of the user.

FIG. 5 shows automatic selection of a webpage including media files such as an image, audio/video file, shortcuts to a file, links, etc directs the composition of criteria specifying the type of webpage ("Select Criteria for Webpage"), e.g., an NFL fantasy football sports page. This criteria defines specifications for determining whether content is relevant to the creation of the requested webpage. The criteria can be incorporated into or represented by search-type keywords. The keywords can be automatically tagged to the relevant media file. FIG. 12 shows various content resources that will be searched to find relevant content. These resources may have already been identified as having a relationship to the user.

A conversation is ended after one of the following events take place:
1. A user on the conversation says the words "Stop conversation", or any other voice command that is programmed by the designer of the application.
2. An indication is made by the user on the application of the current invention. This can be an "End Conversation" button, or any other method on the GUI.
3. After a configurable number of seconds transpire without any of the parties speaking. This number is set in the configuration window of the application.
4. If the application determines that the user did not simply end the call, but the device was disconnected from the system by an unexpected event, such as a network failure, a dead battery in the user's device or the device is turned off.

In any of the cases, a warning screen is presented for the user to verify application termination.

Figure 6:
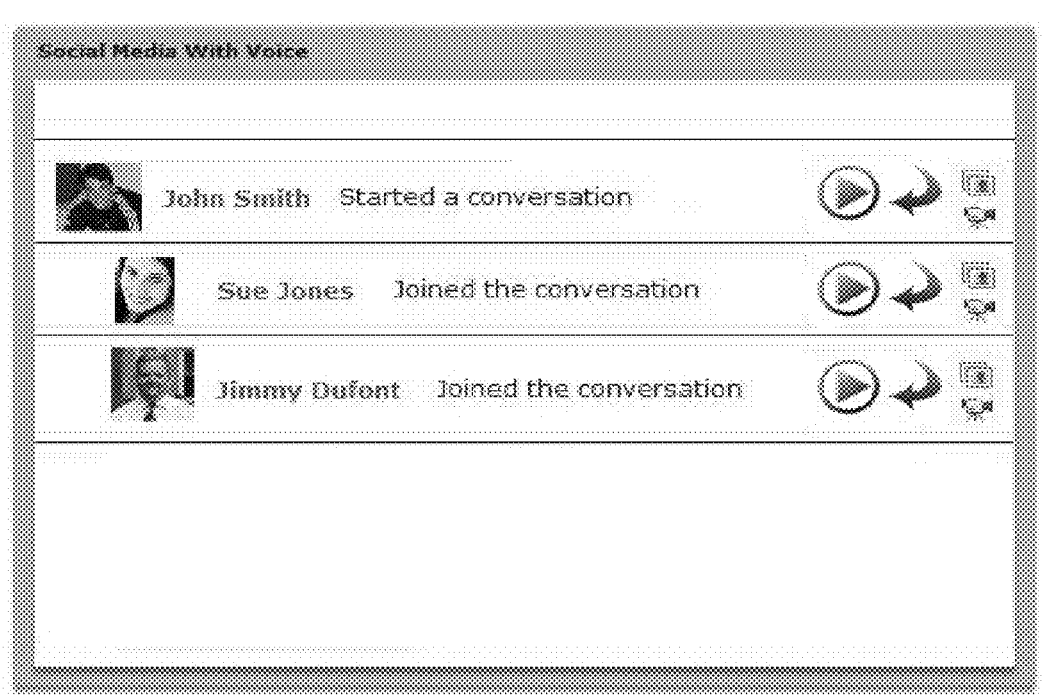
FIG. 6 depicts a possible view of the conversation on the application's web site with a stored conversation, according to the invention.

FIG. 6 depicts a possible view of the conversation on the application's web site with a stored conversation. In FIG. 6, the individual elements of the conversation are presented in consecutive order. The user is able to listen to each part of the conversation by pressing the play button on the right of each speech element in the conversation.

The user is able to add to the conversation by clicking on the arrow button to the right of the speech element wishing to reply. When the arrow button is pressed, an "Add To Conversation" Window will be presented to the user (not shown) allowing the user to speak into the computer system to record the new part of the conversation. An "End" button on the GUI will allow the user to end the conversation piece. The "Add To Conversation" Window will then be removed and the original conversation will be shown to the user, updated with the additional part of the conversation inserted below the speech element that was responded to.

There also exists two media buttons at the far right of each of the speech elements giving the ability for the user to attach images and video. Any of the parties in the conversation can attach images and video to any part of the conversation.

The presence of the image and video icons are only a representative sample of the various types of media that can be attached to the speech elements. One versed in the current technology can easily determine other types of media, for instance documents or music files, that can be attached to an element of the conversation, and determine as well the method to indicate how the media can be attached to the speech element. For instance, a dropdown component can be added to the speech elements wherein all of the various types of media are listed that can be attached.

Other functionality currently available can be added to the application by someone versed in current GUI programming techniques. For example, the GUI image of the user in each of the speech elements can be made clickable. When clicked, different methods can be executed providing a pop up window wherein information of the user is displayed.

Another example is to allow the user to click on the GUI image of the user to listen to the speech element, or respond to a speech element, thereby avoiding the need to have "Play" and/or "Reply" button on the right. The name of the user can also be made clickable, attaching functionality to perform actions when clicked by the user.

Another method is the user simply speaks the name of the party or parties involved in the conversation to hear all of their inputs in the previously recorded conversation. The speech element (or speech elements) prior to that input is first played for the user, followed by the input. This allows the user to know the context of the conversation.

The layout of the speech elements can be programmed differently utilizing item rendering techniques by someone versed in the current GUI programming techniques. The current depiction is not considered the best way to display each of the speech elements, but is made for clarifying the current invention for illustrative purposes only.

Figure 7:
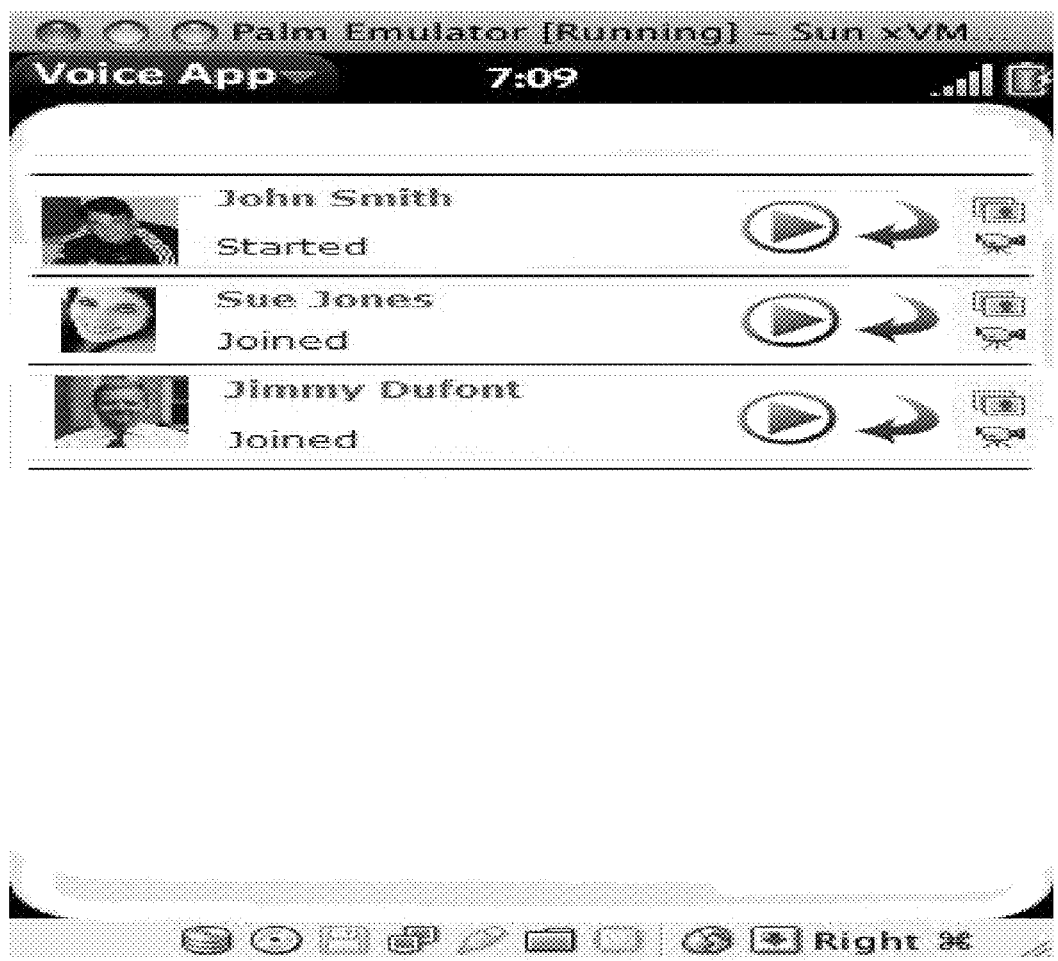
FIG. 7 depicts a GUI of a conversation as seen on a cellular device, according to the invention.

In another embodiment of the current invention, are methods to delete speech elements. For instance, a user swipes a current speech element to the right to remove it from the conversation. When swiped with either a pointing device (on a cellular device), or with a mouse (on a user's computer system), a sub-menu is displayed within the speech elements display space with two buttons: "Delete" and "Cancel". When delete is pressed, a confirmation dialogue is presented to the user wherein the user would have to answer "Yes" to confirm deletion of the speech element, or "No" to cancel the deletion. FIG. 7, the conversation is depicted as seen on a cellular device.

In FIG. 7, the individual elements of the conversation are also presented in consecutive order. The user is able to listen to each part of the conversation by pressing the play button on the right of each speech element in the conversation, depicted by a triangle inside a circle.

The user is able to add to the conversation by clicking on the arrow button to the right of the speech element wishing to reply. When the arrow button is pressed, the user will speak into the cellular device and the application will record the response. The user will hang up the call using the regular methods in interfacing with the particular cellular device. The additional conversation element is then inserted below that speech element in the conversation screen. Also present to the right of the "Reply" button are two icons that, when pressed, will allow the user to attach media to the current speech element. All of the above-mentioned commands can also be performed verbally by the user.

Configuring Conversation Updates: The user has the option of receiving a notification at predefined intervals from the application when the conversation is updated with added conversation parts. The interval is determined by the user in the configuration portion of the application. The options available are Every new conversation element
Every [number] conversation elements
Once per hour
Once per day When the conversation is updated in the application, a notification is sent to the users of the application according to the interval each of the users have indicated in the configuration of the application.

The depiction of the components on the GUI allowing the user to determine the interval of notifications can be in the form of radio buttons wherein one option is chosen by the user, or by a dropdown component. The layout of the configuration will determine the best component selection of the designer of the current invention. Due to the variability of the layout, this disclosure does not illustrate the configuration window of the application, but describes the functionality therein.

Catching up on a Missed Conversation: If a user is an invited party to conversation and is unable to be present for a group's conversation, functionality exists to allow the user to interact with a previous conversation. The user will receive the original notification that a new conversation has begun, if no response is received from the user, the application will not notify the user again, unless the configuration of the notifications override, refer to "Configuring Conversation Updates".

The user is able to listen to the previous conversation by interacting with the application via the cellular device. When the user acknowledges the notification of the conversation, a list of users in the conversation is presented to the user. The user is able to click on each of the users to listen to their portion of the conversation. When playing a user's part of the conversation, the speech segment prior to the user's part of the conversation is played, followed by the user's part, followed by the speech segment after the user's part allowing the listener to understand the context of the segment. The user is also able to click a "Play All" button to listen to the conversation in its entirety.

When the user acknowledges the notification on a smart phone, the user is shown the conversation (either the complete conversation, or the conversation up to that point) see FIG. 7 for a depiction of the GUI for a user on a smart phone.

At that point, the user has the option to listen to each part of the conversation by clicking on the "Play" button. To respond to an element in the conversation, the user presses the "Respond" button and has the ability to interject a new part of the conversation. When complete, the application updates the conversation with the added part below the speech element that was responded.

The new part of the conversation may be indented with the original speech element to indicate that it was a response to the element. When viewing the conversation in the application, indented responses make it easy to follow a large conversation. In addition, different fonts, font colors, font sizes, as well as other GUI elements such as additional lines, and icons can be included to enhance the viewing of the conversation.

In another embodiment of the current invention, the user has the option to listen to the entire conversation at once. When this is chosen, all of the elements of the conversation are played for the user in their entirety. Each of the conversation sections are tagged as being played by the user and the GUI is updated. Therefore, after listening to the entire conversation, the "Play" buttons are changed to their normal, clickable state, and the remaining buttons and icons are enabled.

Receiving an Update to a Conversation: In the configuration of the application of the current invention, the user specifies how often to be notified to updates to a conversation wherein he is a party of See "Configuring Conversation Updates".

When a conversation is updated with additional speech from a user in the group, the application sends a notification to all members of the group if they have chosen to receive notification in the configuration window of the current invention.

The application also updates the web site with the new element in the conversation; refer to "Filtering" section.

For users on a regular cellular device, updates are presented to the user by listing the names of the parties in the conversation that have updated the conversation, listed by time consecutively.

For example, let us assume that there are 5 parties in the conversation, UserA, UserB, UserC, UserD, and UserE. In the conversation, users UserD and UserE have provided additional speech elements to the conversation. The user will receive notification that additional speech elements have been added to the conversation. When navigating to the conversation in the application, the user will able to select a button entitled "Conversation Updates". When this button is clicked, the user will be presented with buttons entitled "UserD", and "UserE", and "Play All Updates" buttons.

When the user clicks the "UserD" button, all of UserD's parts of the conversation are played. For each speech element of UserD played, the segment prior to and after UserD's segments are also played to allow the listener to understand the speech segment in context.

When the user clicks the "Play All Updates" button, all speech elements that have been added to the conversation are played for the user.

For users on a smart phone, the "Play" button of the speech element(s) that have not been listened to has a red color. In addition, the "Reply" button as well as the media icons are inactive and faded out indicating that the user cannot reply to a speech element, or attach media without first listening to it. Once the speech element has been listened to, the buttons and icons are returned to their normal states.

A user on a cellular device is made aware of an event in the application by receiving a notification. When the user acknowledges the notification, the application is started, or made active if already running. The application displays the conversation associated with the notification, and automatically scrolls down the conversation making the updated speech element the center of the screen. See FIG. 8 depicting the application running on a user's smart phone showing two speech elements that have yet to be listened to by the user.

Figure 8:
FIG. 8 depicts an application running on a user's smart phone showing two speech elements that have yet to be listened to by the user, according to the invention.

In FIG. 8, the two new elements are responses to previous speech elements. Foe Example, It can be seen that the originator of the conversation added a response to Jimmy's speech element, and is unread by the current user of the application, determined by the red "Play" button, and the grayed out reply and media buttons. It is also determined that this is a response to Jimmy's speech element due to the indention of John's speech element.

It can also be seen that Jimmy responded to John's response determined by the additional indention of the speech element. It is also unread by the user of the application, determined by the red "Play" button, and the grayed out reply and media buttons. The indention of the responses allows a user to follow lengthy conversations easily.

In another embodiment of the current invention, the elements of the conversation display only the user's name of the particular speech elements in the conversation. When the user of the application rolls over the speech element, the speech element is expanded wherein all of the items in the element are displayed. When the user rolls off the speech element, it is returned to its previous state displaying only the name of the user who added that part of the conversation.

Adding Media to a Conversation: The application of the invention allows media (photos and video) to be inserted into the conversation. For users utilizing a normal cellular device, the navigating to the conversation, there is a button on the bottom of the display entitled "Insert Media". When choosing this button, a sub-menu is displayed to the user with buttons allowing the insertion of pictures and video. The media is uploaded to the application and stored on the applications web site. Due to the vast differences in programming the many available cellular devices, the current disclosure does not depict the details of the interface on a normal cellular device, but discusses the functionality therein.

For users utilizing a smart phone or advanced voice browsing portal, the media is represented by two icons on the right of the individual speech elements. The top icon is for attaching images to the speech element, and the bottom icon is for attaching videos on the application's site. When either of the media icons are clicked, a separate window is displayed (not shown) that allows the user to upload the media from either the local file system of the user's computer, or attach media from a URL.

In another embodiment of the current invention, only the parties in the conversation will have the ability to attach media to the conversation. All other users will see the media buttons disabled.

Figure 9:
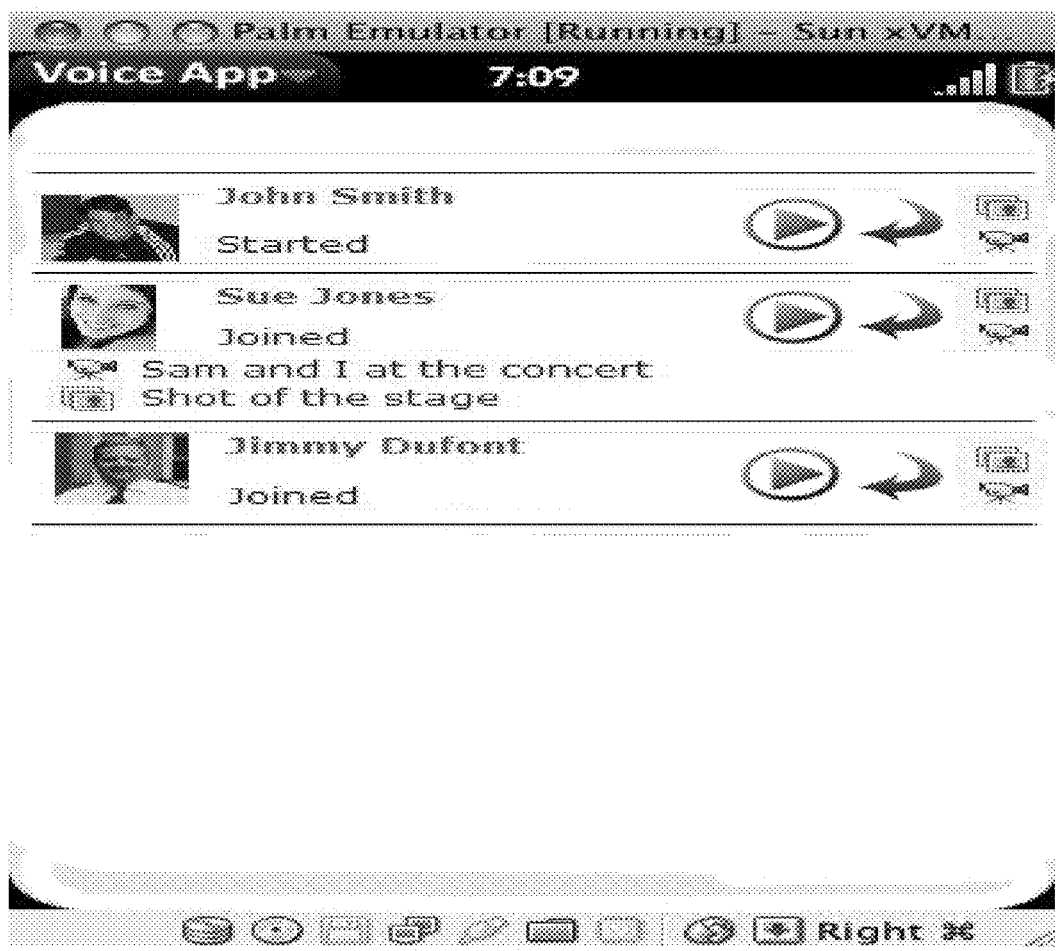
FIG. 9 depicts the application on a user's cellular device with the second party in the conversation having added both a video and an image to the speech element, in accordance to the invention.

In the application either on a cellular device, or on a computer system, when the media is attached to a speech element, the media is displayed at the bottom of the speech element wherein it was attached. When the user clicks on either the media icon or the title of the media, the media is shown in another window (not shown). FIG. 9 depicts the application on a user's cellular device with the second party in the conversation having added both a video and an image to the speech element.

In another embodiment of the current disclosure, a user can access the conversation elements of one or more of the parties in a conversation by either choosing their icons on the application, or by verbally say the parties' names. The application displays all of the conversation elements of those parties, showing the surrounding speech elements to help the viewer understand the context of each element.

In another embodiment of the current disclosure, the topics in the conversation are parsed out and catalogued in the application. The speech elements in the conversation are related to each of the topics that can be queried by a user after the conversation is complete. A user can choose to view only those speech elements pertaining to a specific topic discussed in the conversation by either choosing a topic from a dropdown component in the application's GUI or from voice commands spoken by the user.

When displaying the conversation elements pertaining to the topic, the conversation elements before and after the speech element are displayed to the user allowing the user to understand the conversation element as it occurred in the conversation.

Figure 10:
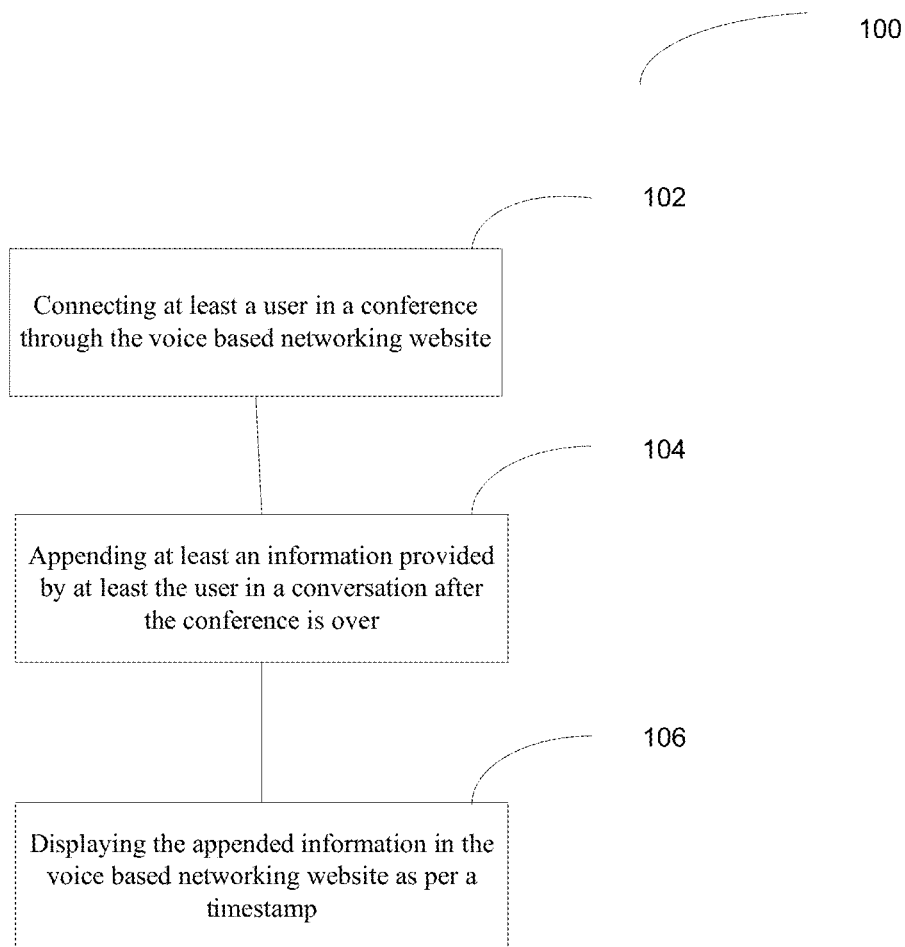
FIG. 10 shows a flowchart of the claimed invention according to the invention.

FIG. 10 shows certain aspects of the present disclosure that relates to a computer implemented method for executing application code to connect with a social networking website 100. A step 102 includes connecting at least a user in a conference through the voice based networking website. A step 104 includes appending at least an information provided by at least the user in a conversation after the conference is over. At step 106 displaying the appended information in the voice based networking website as per a timestamp.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage or a database media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computer implemented method for executing application code in a voice based networking website, the method comprising:
   connecting a plurality of users to a conference through the voice based networking website;
   conducting a voice conversation between the plurality of users wherein a plurality of devices of the plurality of users individually submit origination packets containing speech of the respective user during the voice conversation;
   displaying through the voice based networking website a voice conversation pertaining to the conference, displaying the conversation comprising displaying a sequence of speech elements of a plurality of participants of the conference, the sequence of speech elements ordered according to an originating timestamp of the respective speech element;
   appending at least an information provided by at least the user in a conversation after the conference is over; and
   displaying the appended information in the voice based networking website as an insert between two speech elements of the sequence of speech elements;
   wherein displaying the appended information further comprising generating at least a tag after analyzing the conversation and filtering at least a word from the analyzed conversation;
   wherein the tag includes at least a media file;
   wherein the application scans most relevant media file in at least the user profile to link the tag as per at least the filtered word from the analyzed conversation.

2. The method of claim 1, wherein the conversation is stored according to the timestamp, allowing the conversation to be modified, updated and presented in the social network website.

3. The method of claim 1, further comprising allowing at least the user to search and review the conversation before and after at least the appended information so as the user can understand the conversation element as it occurred.

4. The method of claim 1, wherein at least the user receives a notification that at least the information is available.

5. The method of claim 1, wherein the user is provided an ability to attach at least a media file to the conversation.

6. The method of claim 1, wherein the conversation includes at least a voice conversation and at least a text conversation.

7. The method of claim 1, wherein the media file inserted in the voice based networking website may be linked with at least a URL, a tag, a shortcut to another file.

8. The method of claim 1, further comprising using at least the filtered word from the analyzed conversation and scanning most relevant media file from a database.

9. A computing device for executing application code to connect with a voice based networking website, the computing device comprising:
   a processor;
   a memory communicably coupled to the processor and storing instructions to configure the computing device to analyze computer code via operations comprising:
   connect a plurality of users to a conference through the voice based networking website;
   conduct, by the voice based networking website, a voice conversation between the plurality of users wherein a plurality of devices of the plurality of users individually submit origination packets containing speech of the respective user during the voice conversation;
   display through the voice based networking website a conversation pertaining to the conference, the display of the conversation comprising a sequence of speech elements of a plurality of participants of the conference, the sequence of speech elements ordered according to an originating timestamp of the respective speech element;

append at least an information provided by at least the user in a conversation after the conference is over; and display the appended information in the voice based networking website as an insert between two speech elements of the sequence of speech elements;

wherein displaying the appended information further comprising generating at least a tag after analyzing the conversation and filtering at least a word from the analyzed conversation;

wherein the tag includes at least a media file;

wherein the application scans most relevant media file in at least the user profile to link the tag as per at least the filtered word from the analyzed conversation.

10. The computing device of claim 9, wherein the conversation is stored according to the timestamp, allowing the conversation to be modified, updated and presented in the social network website.

11. The computing device of claim 9, wherein the processor is configured to:

notify at least the user that at least the information is updated.

12. The computing device of claim 9, wherein the processor comprises sharing at least the information with all the communication devices as configured by the user.

13. The computing device of claim 9, further comprising using at least the filtered word from the analyzed conversation and scanning most relevant media file from a database.

14. A computer-readable media having computer-executable instructions embodied thereon, the computer-executable instructions upon execution configuring a computer to perform operations for executing application code to connect with a voice based networking website comprising, the computer-readable medium comprising code for:

connecting a plurality of users to a conference through the voice based networking website;

conducting a voice conversation between the plurality of users wherein a plurality of devices of the plurality of users individually submit origination packets containing speech of the respective user during the voice conversation;

displaying through the voice based networking website a conversation pertaining to the conference, displaying the conversation comprising displaying a sequence of speech elements of a plurality of participants of the conference, the sequence of speech elements ordered according to an originating timestamp of the respective speech element;

appending at least an information provided by at least the user in a conversation after the conference is over; and displaying the appended information in the voice based networking website as an insert between two speech elements of the sequence of speech elements;

wherein displaying the appended information further comprising generating at least a tag after analyzing the conversation and filtering at least a word from the analyzed conversation;

wherein the tag includes at least a media file;

wherein the application scans most relevant media file in at least the user profile to link the tag as per at least the filtered word from the analyzed conversation.

\* \* \* \* \*